United States Patent [19]

Pelz

[11] Patent Number: 4,469,376
[45] Date of Patent: Sep. 4, 1984

[54] HINGE, PARTICULARLY FOR SEAT WITH ADJUSTABLE BACK REST AND METHOD OF MANUFACTURING THE SAME

[75] Inventor: Herbert Pelz, Remscheid, Fed. Rep. of Germany

[73] Assignee: Keiper Automobiltechnik GmbH & Co KG, Remscheid, Fed. Rep. of Germany

[21] Appl. No.: 376,846

[22] Filed: May 10, 1982

[30] Foreign Application Priority Data

May 13, 1981 [DE] Fed. Rep. of Germany ....... 3118896

[51] Int. Cl.³ .................. A47C 1/24; B21K 1/30; B23P 15/14
[52] U.S. Cl. .................. 297/362; 16/354; 29/159.2; 74/804
[58] Field of Search ........... 297/362; 29/159.2, 11; 74/460, 804, 805; 16/354

[56] References Cited

U.S. PATENT DOCUMENTS 1,352,021  9/1920  Opperman ................ 29/159.2
3,337,940  8/1967  Stihl et al. .............. 29/159.2 X Primary Examiner—William E. Lyddane
Assistant Examiner—Peter R. Brown
Attorney, Agent, or Firm—Michael J. Striker

[57] ABSTRACT

A hinge has two hinge parts pivotally connected with one another and an adjusting and fixing device including interengaging external and internal gears, wherein each gear has an annular groove formed by deformation in the region of its teeth root circle so that during formation of the annular groove the material is displaced toward the teeth tips of the respective gear.

7 Claims, 8 Drawing Figures

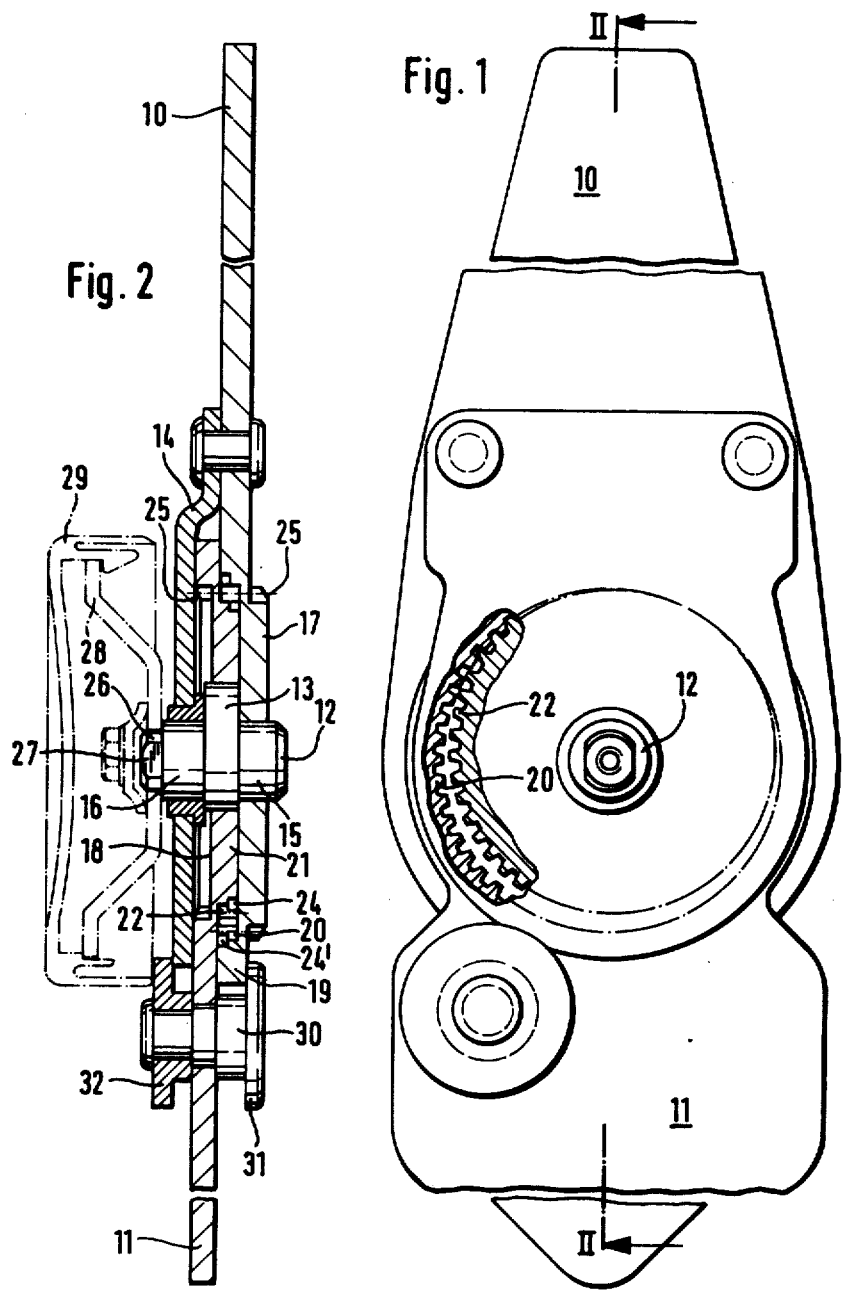

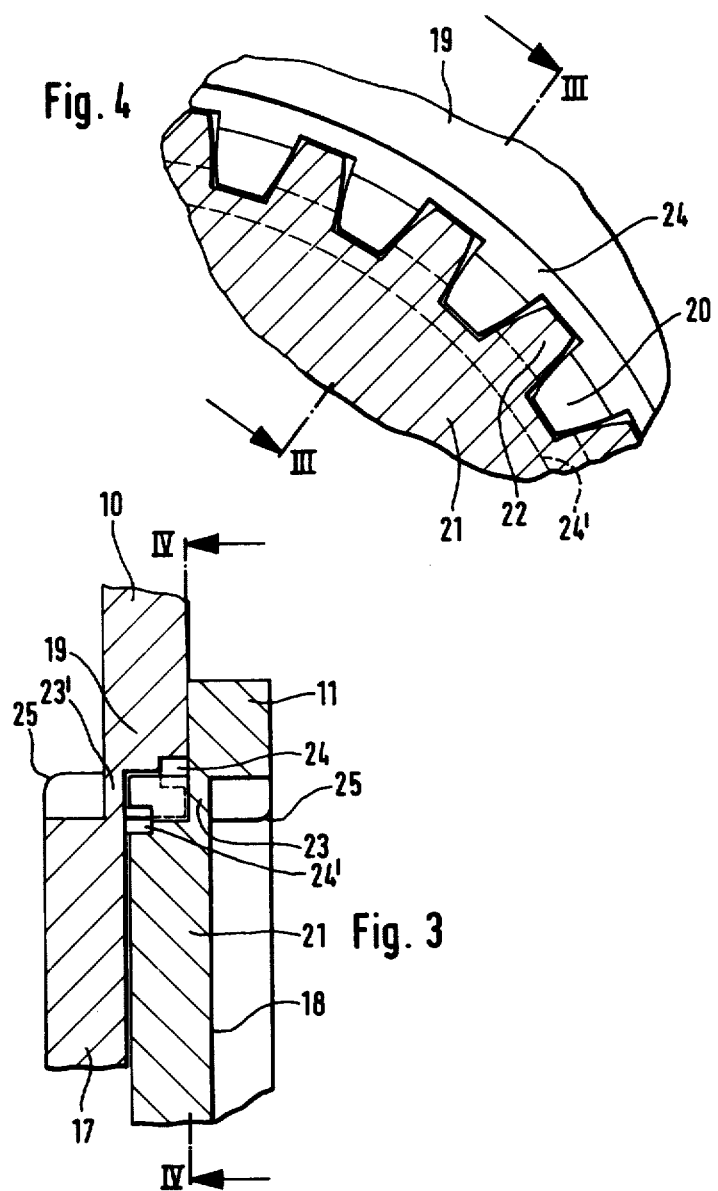

HINGE, PARTICULARLY FOR SEAT WITH ADJUSTABLE BACK REST AND METHOD OF MANUFACTURING THE SAME

BACKGROUND OF THE INVENTION

The present invention relates to a hinge, particularly for a seat with an adjustable back rest.

Hinges of the above mentioned general type are known in the art. A known hinge has two hinge parts pivotable relative to one another via an axle forming a pivot axis, and means for adjusting and fixing the hinge parts so as to retain them in a predetermined relative position and formed as a transmission including an internal gear and an external gear engageable with one another and provided with a rotatable eccentric on the axle. The hinge parts of the known hinges have depressed portions produced by fine stamping centrally to the pivot axis or the axis of eccentric. During formation of an internal gear, its teeth are cut through the respective depressed portion, whereas during formation of an external gear the teeth are located on the depressed portion. The teeth produced by a fine stamping have at their teeth tips, starting from the free end side, stamping indentations facing toward the connection point. Thereby the teeth in their end side in the head region are seen as somewhat inclined. These stamping indentations connected with the fine stamping process reduce the actual teeth width, so that the stamping indentations must be taken into consideration during the force transmissive arrangement of the teeth and must be counted as a surplus for the effective supporting teeth width when the thickness of the hinge parts is selected. Thereby each hinge part is thicker than it would have to be if the stamping indentations were avoided.

SUMMARY OF THE INVENTION

Accordingly, it is an object of the present invention to provide a hinge and a method of manufacturing the same which avoid the disadvantages of the prior art.

More particularly, it is an object of the present invention to provide a hinge and a method of manufacturing the same in accordance with which stamping depressions on teeth tips produced during fine stamping of the teeth are considerably reduced.

In keeping with these objects, and with others which will become apparent hereinafter, one feature of the present invention resides, briefly stated, in a hinge having two hinge parts and a transmission therebetween including interengaging internal gear and external gear, wherein each gear is deformed in the region of its teeth root circle so as to form in this region an annular groove displacing the material of a respective one of the gears toward its teeth tips.

When the hinge is designed and the method is performed in accordance with the present invention, the material of each hinge part is forced from the region of the annular groove to flow to the teeth tips, whereby a free space which would otherwise be formed by the above mentioned stamping indentations is progressively filled by the flowing material. The experiments showed that the teeth indenting at the teeth tips is reduced by approximately 90%, which leads to considerable loading advantages of to 30% increased load. This also makes possible to reduce the teeth thickness and in connection with this also the material thickness of the hinge part, which leads with the same loading of the same hinge part to weight economy.

In accordance with another feature of the present invention, the annular grooves are produced simultaneously and together with the fine stamping for producing in the hinge part of depressed portions provided with the teeth, in the same working step.

Still another advantageous feature of the present invention is that the annular groove is arranged at a side which is opposite to the connecting point between the depressed portion and the remaining portion of the respective hinge part.

For providing definite flowing of the material displaced from the annular groove toward the teeth tips, it is advantageous when the annular groove cuts the root circle of the internal gear and the external gear.

The annular groove is arranged in dependence upon the teeth shape, material thickness, quality and loading criteria. However, in accordance with a further feature of the present invention, it has been found that it is advantageous when the center of the cross section of the annular groove, and the teeth root circles of the internal gear and the external gear are located at the same circumferential plane.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a lateral view of a hinge according to the present invention;

FIG. 2 is a view showing a section of the inventive hinge, taken along the line 2—2 in FIG. 1;

FIG. 3 is an enlarged view taken along the line 3—3 in FIG. 4, on an enlarged scale as compared with FIG. 1;

FIG. 4 is a view taken along the line 3—3 in FIG. 3;

DESCRIPTION OF THE PREFERRED EMBODIMENTS

Figure 5:
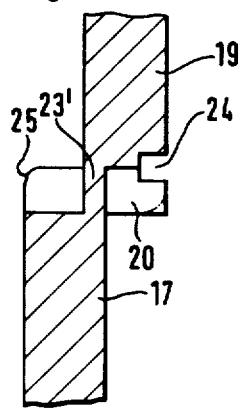
FIGS. 5-8 show annular grooves formed in an internal gear of a transmission of the inventive hinge, in accordance with several embodiments of the invention.

In seats of power vehicles, a back rest is in many cases pivotally connected with a seat part via a hinge. Such a hinge is shown in FIGS. 1 and 2 and has a hinge part 10 connected with a back rest and a hinge part 11 which is connected to the seat part of the seat. Both hinge parts are pivotally connected with one another by an axle 12 defining a pivot axis.

The axle 12 has an eccentric portion 13 on which, in the shown embodiment, the hinge part 11 connected with the seat part is pivotally supported. The hinge part 10 which is connectable with the back rest is fixedly connected with a supporting bracket 14, for example by riveting. The supporting bracket 14 is pivotable together with the hinge part 10 on central portions 15 and 16 of the axle 12. Each of the hinge parts 10 and 11 has a depression 17 and 18. The depression 17 of the hinge part 10 has a plurality of inner teeth 20 forming an internal gear 19. The depression 18 of the hinge part 11 has a plurality of outer teeth 22 forming an external gear 21.

The hinge part 11 has a connecting section 23 between the depression 18 forming the internal gear 21 and a remaining portion of the hinge part 11. The connecting section 23 corresponds to a connecting section 23' provided on the hinge part 10 between the internal gear 19 and the depression 17. These connecting sections are formed since the depressions and the remaining portions of the hinge part are formed of one piece with one another. The depressions 17 and 18 are pressed by a fine stamping out of the respective hinge parts 10 and 11. The teeth 20 of the internal gear 19 of one hinge part and the teeth 22 of the external gear 21 of the other hinge part are pressed simultaneously with stamping out of the depressions.

The teeth 20 and 22 of each hinge part 10 and 11 are formed at their one side, whereas the other side of the respective hinge part has a corresponding counterprofile which is offset in the circumferential direction relative to the above mentioned teeth by one half of the tooth pitch.

Annular grooves 24 and 24' are formed in the teeth 20 or 22 at an end side facing away from the connecting sections 23 and 23' and in the region of the teeth root circle, both in the internal gear 19 and in the external gear 21. The annular grooves 24 and 24' are pressed in the hinge parts 10 and 11 with a deformation of their material. By the simultaneous pressing in of such an annular groove in the region of the teeth root, a certain material displacement toward the teeth tips takes place, so that indentations 25 which take place at the outer edges of the counterprofile are considerably reduced in the teeth 20 and 22, so that the entire teeth width is available and the teeth overlapping is improved.

Figure 6:
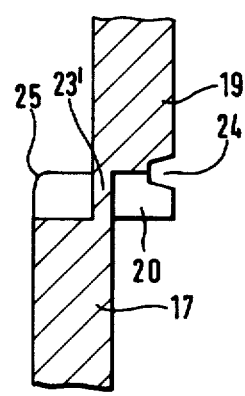
Figure 7:
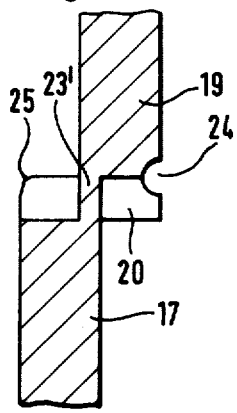
Figure 8:
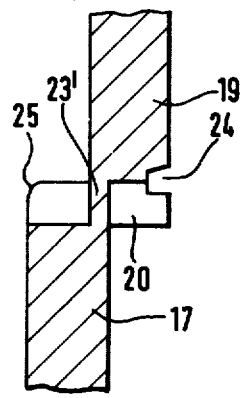

The annular grooves 24 may have different shapes, as shown for the internal gear 19 in FIGS. 5–8. The size and the shape of the annular grooves is selected in dependence upon the teeth shape, the material thickness, the quality and the loading. The cross section of the annular grooves can be rectangular as shown in FIG. 5, trapezoidal as shown in FIG. 6, semicircular as shown in FIG. 7, or half-trapezoidal as shown in FIG. 8. It is to be understood that the annular grooves may have also further cross sections.

The external gear 21 formed in the depression 18 has a head circle which is at least by one tooth height smaller than the root circle of the internal gear 19 provided in the depression 17 and having the inner teeth 20. The number of teeth of the internal gear 19 and the external gear 21 differ from one another by at least one tooth. Thereby during rotation of the axle 12, a relative movement between the internal gear 19 and the external gear 21, and therefore also between the hinge parts 10 and 11, takes place. The eccentric part 13 of the axle 12 holds the inner teeth 20 of the internal gear 19 in engagement at one location with the outer teeth 22 of the external gear 21 pivotally supported on the eccentric portion 13 of the axle 12.

The central portion 16 of the axle 12 is supported in a bush of the supporting bracket 14 and extends with its pin 26 outwardly beyond the supporting bracket 14. The pin 26 has a flattening 27 at two opposite sides thereof. The pin 26 serves for a non-rotatable mounting of a cam disk 28 shown in broken lines and carrying a hand wheel 29 which is also shown in broken lines.

The axial connection of the hinge parts 10 and 11 is secured, for example, by a head bolt 30 which is fixed in the hinge part 11 and overlaps a marginal zone of the internal gear 19 by its head portion 31, on the one hand, and also overlaps by a flange of its bush 32 the marginal zone of the supporting bracket 14 in the radial direction. Mounting of the hinge parts 10 and 11 on the back rest and the seat part, respectively, may be performed by not shown mounting screws or by also not shown bulge corrugations for welding connection.

For manufacturing of depressed portions which have teeth and are of one piece with the hinge part itself, the depressions may be formed by fine stamping from a flat sheet blank, and the fine stamping of the depressions is performed simultaneously and together with the annular groove in the region of the teeth feet in the same working step. Thereby the material displaced from the annular grooves forcibly flows to the teeth tips and the stamping indentations which otherwise would take place in the teeth tip region are considerably reduced.

As mentioned above, the shown embodiments illustrate only exemplary executions of the invention and do not limit the same. Many other embodiments and constructions are possible. For example, the annular grooves are introduced in all gears which are pressed from one sheet blank, so as to avoid the formation of the indentations on the tooth head. The thus manufactured gears are not limited to the utilization only in a hinge for the vehicle seat, but instead can be used for other adjusting drives, such as for example an arrangement for longitudinal adjustment of a seat, an arrangement for vertical adjustment of a seat, an arrangement for lifting windows, and the like.

It will be understood that each of the elements described above, or two or more together, may also find a useful application in other types of constructions differing from the types described above.

While the invention has been illustrated and described as embodied in a hinge and a method of manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A hinge, particularly for a seat unit having a seat and an adjustable back rest, comprising two hinge parts pivotable relative to one another and each connectable with a respective one of the seat and the back rest; an axle pivotally connecting said hinge parts with one another and defining a pivot axis; and means for adjusting and fixing said hinge parts relative to one another so as to provide for a desired relative position of the latter, said means being formed as a transmission for interengaging at least one internal gear and at least one external gear formed on said hinge parts respectively, and including a rotatable eccentric arranged on said axle, said internal gear and said external gear each being deformed in the region of its teeth root circle so as to form in said region an annular groove displacing the material of a respective one of said gears toward its teeth tips.

2. A hinge as defined in claim 1, wherein each of said internal and external gears has a depressed portion connected by a connecting section with a remaining portion at one side of the respective gear, said annular groove being provided in each of said internal and external gears at its side opposite to said first-mentioned side of said connecting section.

3. A hinge as defined in claim 1, wherein said annular groove of said each of internal gear and said external gear is arranged so that it cuts the root feet circle of a respective one of said gears.

4. A hinge as defined in claim 1, wherein said annular groove of each of said internal and external gears has a cross section with a center located in a predetermined circumferential plane, the teeth root circle of said internal gear and the teeth root circle of said external gear being located in the same circumferential plane.

5. A method of manufacturing pivotable hinge parts of a hinge including the steps of providing a hinge part with a gear of one piece therewith; deforming the hinge part in the region of a root circle of the gear so as to produce in this region an annular groove in which the excess material produced by the formation of said annular groove is displaced toward the teeth tips of the gear.

6. A method of manufacturing as defined in claim 5, wherein said providing step further includes forming a depressed portion in the hinge part provided with the gear, said deforming step for producing said annular groove and said forming step for forming the depressed portion are performed simultaneously and together with one another in one working step.

7. A method of manufacturing as defined in claim 6, wherein said forming step includes fine punching of the depressed portion from a flat blank.

* * * * *